(12) United States Patent
Rawdon

(10) Patent No.: US 7,641,177 B2
(45) Date of Patent: Jan. 5, 2010

(54) FORCE TRANSFER ASSEMBLIES

(75) Inventor: Blaine K. Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 762 days.

(21) Appl. No.: 11/332,907

(22) Filed: Jan. 17, 2006

(65) Prior Publication Data
US 2007/0177707 A1 Aug. 2, 2007

(51) Int. Cl.
*B66D 3/08* (2006.01)
(52) U.S. Cl. ..................................... 254/393
(58) Field of Classification Search .................. 254/393
See application file for complete search history.

(56) References Cited

U.S. PATENT DOCUMENTS

| | | | | |
|---|---|---|---|---|
| 796,929 | A | * | 8/1905 | Parker .......................... 16/400 |
| 2,647,943 | A | * | 8/1953 | Kreisler ....................... 174/207 |
| 3,376,034 | A | * | 4/1968 | Ondrejka ...................... 267/71 |
| 4,052,026 | A | | 10/1977 | Wood |
| 4,398,336 | A | | 8/1983 | Beuch |
| 5,016,026 | A | | 5/1991 | Flory |
| 5,647,198 | A | | 7/1997 | Mihailovic |
| 6,386,516 | B1 | * | 5/2002 | Lenders ....................... 254/393 |
| 6,405,833 | B1 | * | 6/2002 | Baranda et al. ............. 187/254 |
| 6,578,329 | B1 | | 6/2003 | Stubler et al. |
| 7,086,803 | B2 | * | 8/2006 | Ackerman et al. .......... 403/210 |

OTHER PUBLICATIONS

*Rama 8 Bridge*, Buckland & Taylor Ltd. Bridge Engineering, 1 page, Available at http://www.b-t.com/projects/rama8.html, Visited Oct. 17, 2005.

* cited by examiner

*Primary Examiner*—Emmanuel M Marcelo
(74) *Attorney, Agent, or Firm*—Alston & Bird LLP

(57) ABSTRACT

Force transfer assemblies are provided for transferring forces from tensionable members to receiving structures. The assemblies may include nested thimbles that transfer respective forces from respective tensionable members to receiving structures such as cylindrical members. An outer thimble may transfer force from an outer tensioned member to a receiving structure without causing compression of an inner tensioned member. For example, the outer thimble may transfer forces by way of the inner thimble or to a boss of the receiving structure. Forces from a tensioned member or assembly of tensioned members may be distributed along a cylindrical member by a thimble having a convex bearing surface or by spaced thimbles disposed along the cylindrical member.

20 Claims, 10 Drawing Sheets

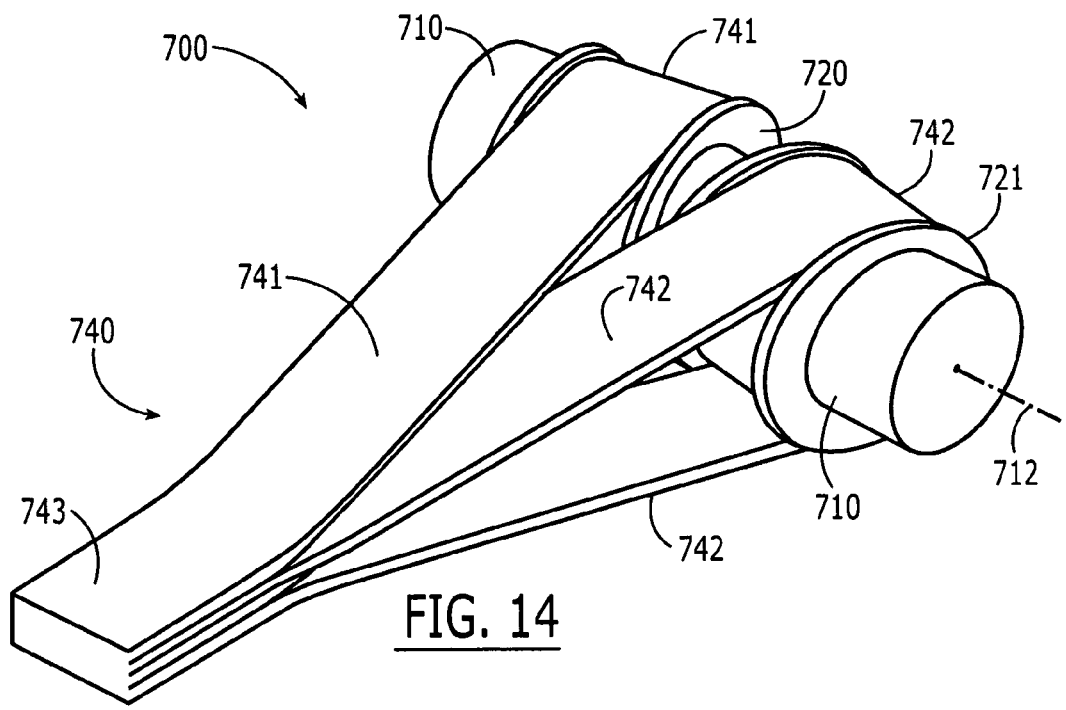
FIG. 14
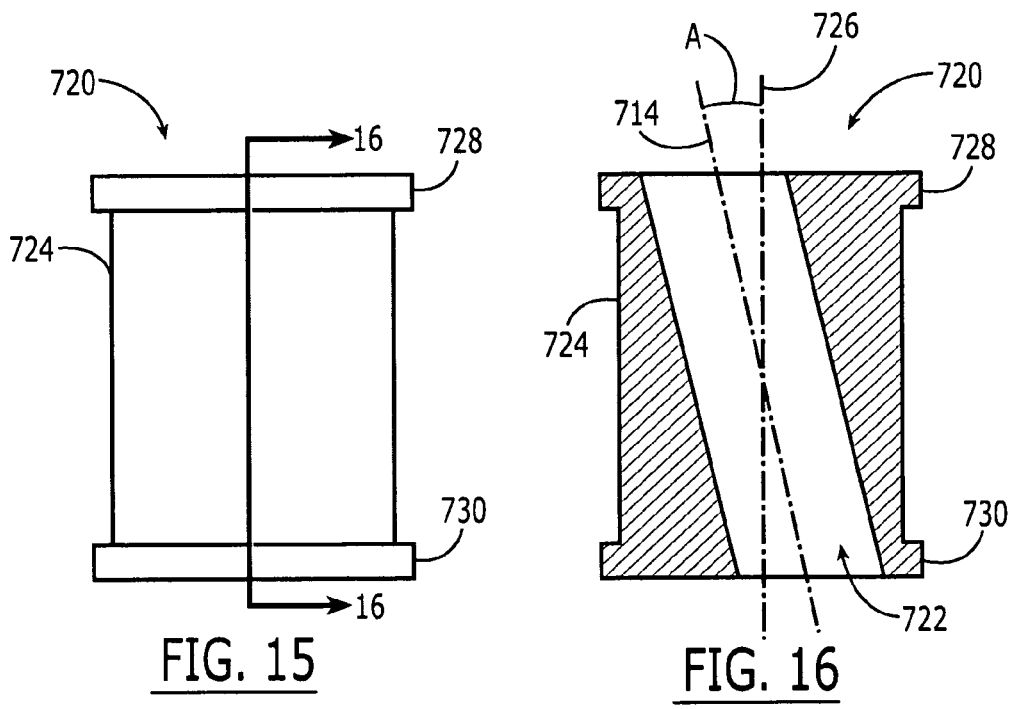
FIG. 15
FIG. 16

FORCE TRANSFER ASSEMBLIES

FIELD OF THE INVENTION

Embodiments of the present invention relate generally to force transfer assemblies that transfer forces from tensioned members such as cables to receiving structures. More particularly, embodiments of the invention relate to thimbles disposed between tensionable members and receiving structures such as rigid cylindrical members.

BACKGROUND OF THE INVENTION

Cables, belts, and straps are utilized as tensional elements in bracing systems found in aircraft, boats, cranes, winches, bridges and various other mobile and static structures such as buildings and signage structures. Naturally, light weight assemblies of cables and connecting elements are typically preferred in order both to save expenses in their constructions and to maximize payload capabilities of a structure. Compact assemblies are typically preferred in order to maximize the useful space within a structure and in order to minimize the overall size of a structure. Compact assemblies are also typically preferred where cables and connecting elements are exposed and are subject to fluid forces. Fluid forces such as the air resistance forces encountered by vehicles such as aircraft and boats may result in higher fuel expenses and shorter travel ranges. Fluid forces such as wind loads may affect the stability of structures such as bridges and may therefore increase construction costs and adversely affect longevity.

With some assemblies having tensioned cables, the weakest portions of the assemblies are found where cables couple to connecting elements. Forces transverse to the longitudinal axes of cables are often introduced at couplings and connections by clamps, crimps, and other connecting means. Transverse forces that tend to compress or flatten a cable can compromise the effective tensional strength of the cable. Such compromising transverse forces may be of concern when using even time-honored materials such as steel cables, but are often of heightened concern when using modern fibers.

Some classes of modern synthetic fibers provide the advantages of low weights relative to metal cables having similar tensile strengths. Examples of modern synthetic fibers include DuPont's Kevlar (™) and Teijin's Technora (™). Some examples of synthetic fibers are spun in slender fibers and are grouped together to form yarns which are further grouped to form cables and other tensionable assemblies. The molecular structure of some typical such fibers provide impressive tensile strength along their lengths but are vulnerable to damage and failure when subjected to forces transverse to their lengths such as shear forces and transverse compression forces. Thus, particular care is needed when terminating, coupling, connecting and wrapping some modern yarns, cables, belts and other tensionable assemblies of fibers.

Often a thimble is disposed between a tensioned cable and an anchor in order to inhibit kinking of the cable. For example, a thimble and thimble insert are described in the U.S. Pat. No. 4,398,336 to Beuch, wherein the cable passes about a thimble and is secured thereabout by a swage. A high strength cable of synthetic fibers can be produced by wrapping a synthetic fiber or yarn of fibers multiple times about spaced opposing thimbles such that an elongate fiber assembly extends between the thimbles. A high number of wraps can be achieved so that the load on any fiber or yarn strand is small once the cable is tensioned. The termination of the wrapping can be achieved with friction, with a swage, or with a simple knot. A problem arises, however, when strong cables are needed. As wraps are added to the assembly, thickness is built up as layer upon layer of fibers or yarns are wrapped. When the complete cable is tensioned, relatively inner layers abutting the thimbles are pressed upon by relatively outer layers such that the inner layers are subjected to compression forces. Undesirable damage and even a cascading failure of a cable may result beginning with the failures of inner-most layers.

In order to assure the integrity and durability of a cable, a large cable having superfluous tensional strength along its length can be used and tensions that may challenge a cable at terminations and connections can be minimized or eliminated by careful practice. Such solutions, however, entail using cables that are heavy and that have large cross-sectional areas. Such solutions are therefore less than optimal and, in a sense, defeat many of the very goals underlying the development of modern fibers which were developed to be lightweight and compact.

A need exists for improvements in cable terminations and connectors. A need exists for compact devices for coupling cables to structures. A need exists for improved cable terminations and connectors that exploit the tensional strengths of fiber assemblies and that protect fiber assemblies from the vulnerabilities of modern fibers with regard to shear forces and transverse compressions.

BRIEF SUMMARY OF THE INVENTION

Embodiments of the invention may address at least some of the above needs and achieve other advantages. For example, a first aspect of the invention relates to a force transfer assembly for transferring forces from tensioned members to a receiving structure. A force transfer assembly may include a first thimble and a second thimble each for disposition at least partially about a receiving structure such that the thimbles are nested together and such that the thimbles transfer forces from respective first and second tensionable members to the receiving structure.

In one embodiment according to the first aspect of the invention, a flange is disposed between the first thimble and second thimble such that force can be transferred from the second tensionable member to the receiving structure by way of the flange. In at least one embodiment force can be transferred to a boss by the first thimble, and in at least another embodiment force can be transferred to a cylindrical member by the first thimble. The first and second thimbles may be nested together such that the second thimble can be prevented from compressing the first tensionable member. Examples of receiving structures include parts of aircraft, watercraft, and bridges.

A second aspect of the invention relates to a force transfer assembly that includes a receiving structure, a first thimble supported by the receiving structure, a first tensioned member passed at least partially about the first thimble, a second thimble supported by the first thimble, and a second tensioned member passed at least partially about the second thimble. Forces may be transferred from the first tensioned member to the receiving structure by way of the first thimble and from the second tensioned member to the receiving structure by way of the second thimble and first thimble.

In one embodiment according to the second aspect of the invention, the second thimble and first thimble can be nested together such that the first thimble can be at least partially surrounded by the second thimble. For example, the second and first thimbles may be concentrically arranged about a portion of the receiving structure. In at least one embodiment, a flange may extend between the first thimble and the second thimble such that the second thimble can be supported by way of the flange. The flange may be attached to the first thimble and may be disposed between two tensioned members passed at least partially about the first thimble.

A third aspect of the invention relates to a force transfer assembly that includes a thimble having a convex bearing surface for passage of a tensionable member thereabout such that force can be transferred from the tensionable member to the thimble and from the thimble to a cylindrical member. For example, the thimble may include an inner bearing surface defining a channel for receiving the cylindrical member.

In one embodiment according to the third aspect of the invention, the thimble includes a pair of spaced flanges for guiding the tensionable member. A converging guide may be included for disposition about the tensionable member and for guiding the tensionable member to converge from the bearing surface of the thimble to the converging guide.

A fourth aspect of the invention relates to a force transfer assembly that includes two thimbles, each having a cylindrical outer bearing surface and a cylindrical bore that can be non-parallel with the cylindrical outer bearing surface. The first thimble and second thimble may be disposed about a cylindrical member spaced from each other and oriented such that two tensionable members respectively passed about the two thimbles may be guided toward each other.

BRIEF DESCRIPTION OF THE SEVERAL VIEWS OF THE DRAWINGS

Figure 1:
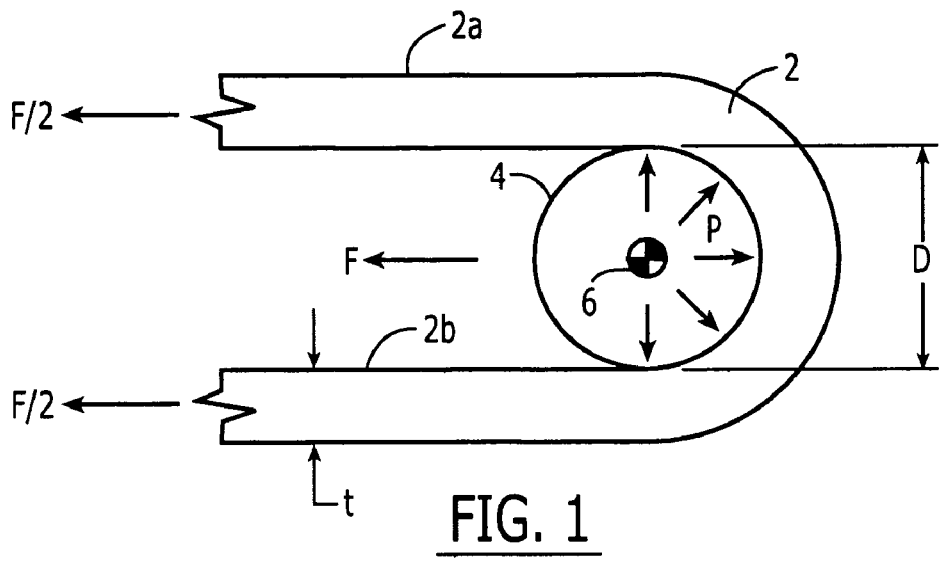
Figure 2:
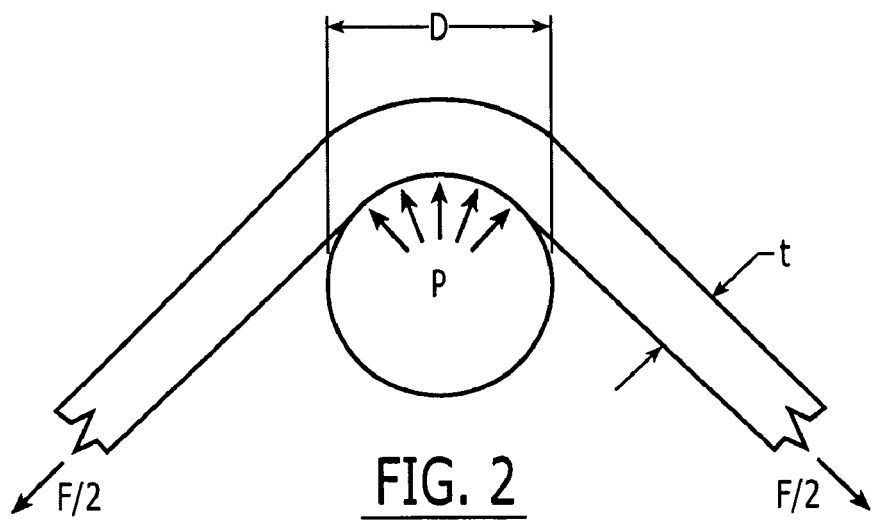
Figure 3:
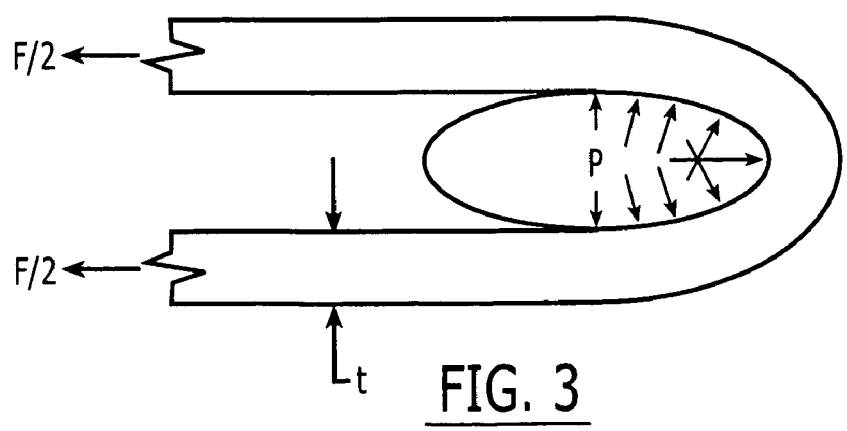
Figure 4:
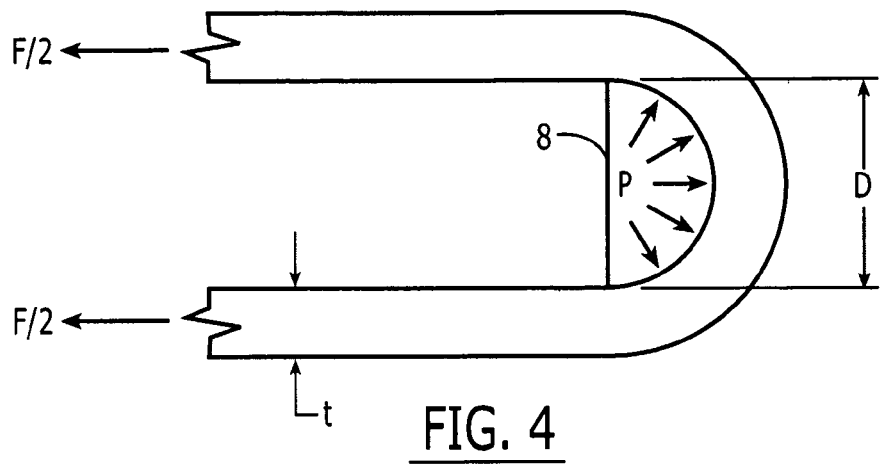
Figure 5:
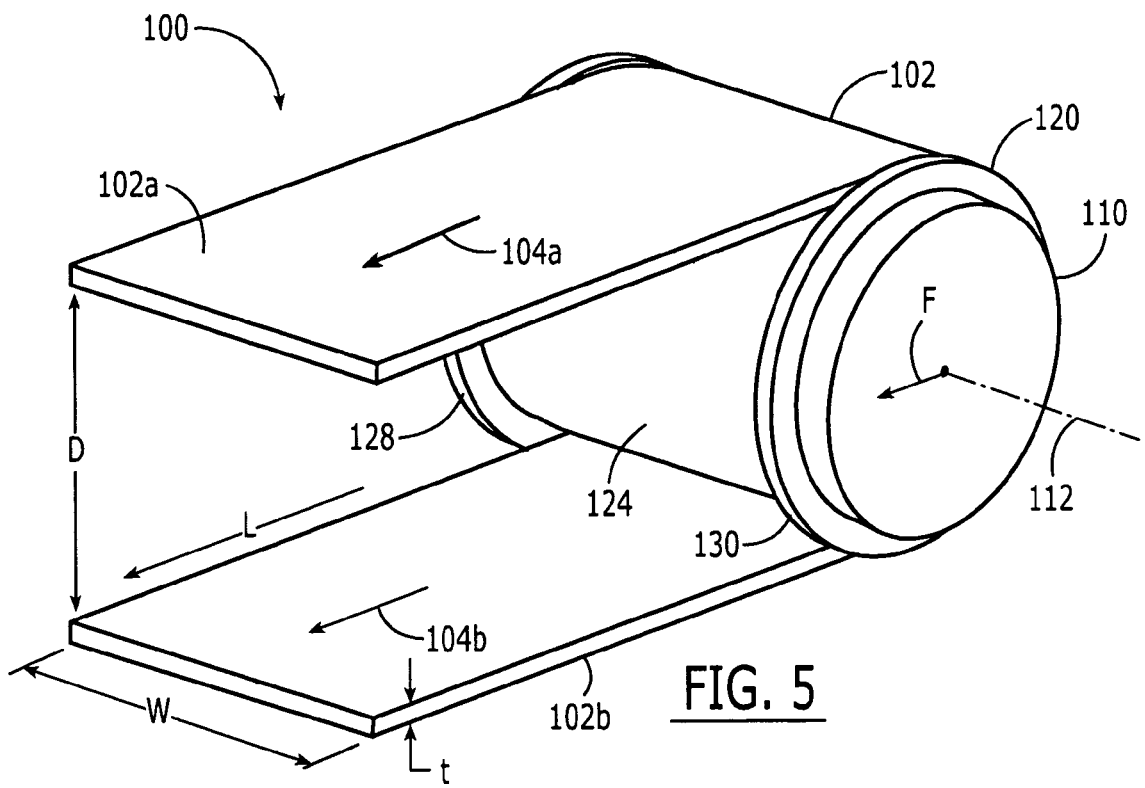
Figure 6:
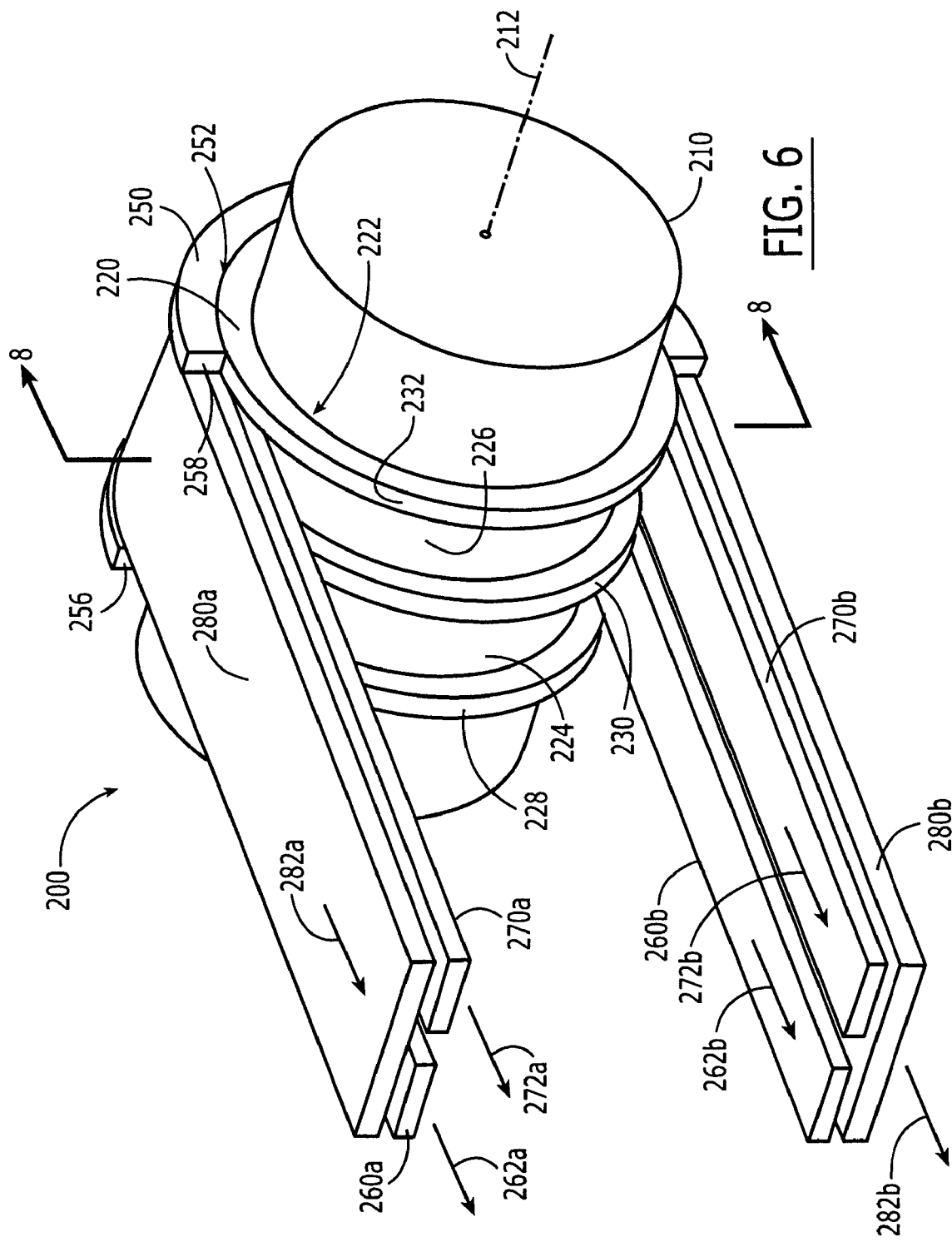
Figure 7:
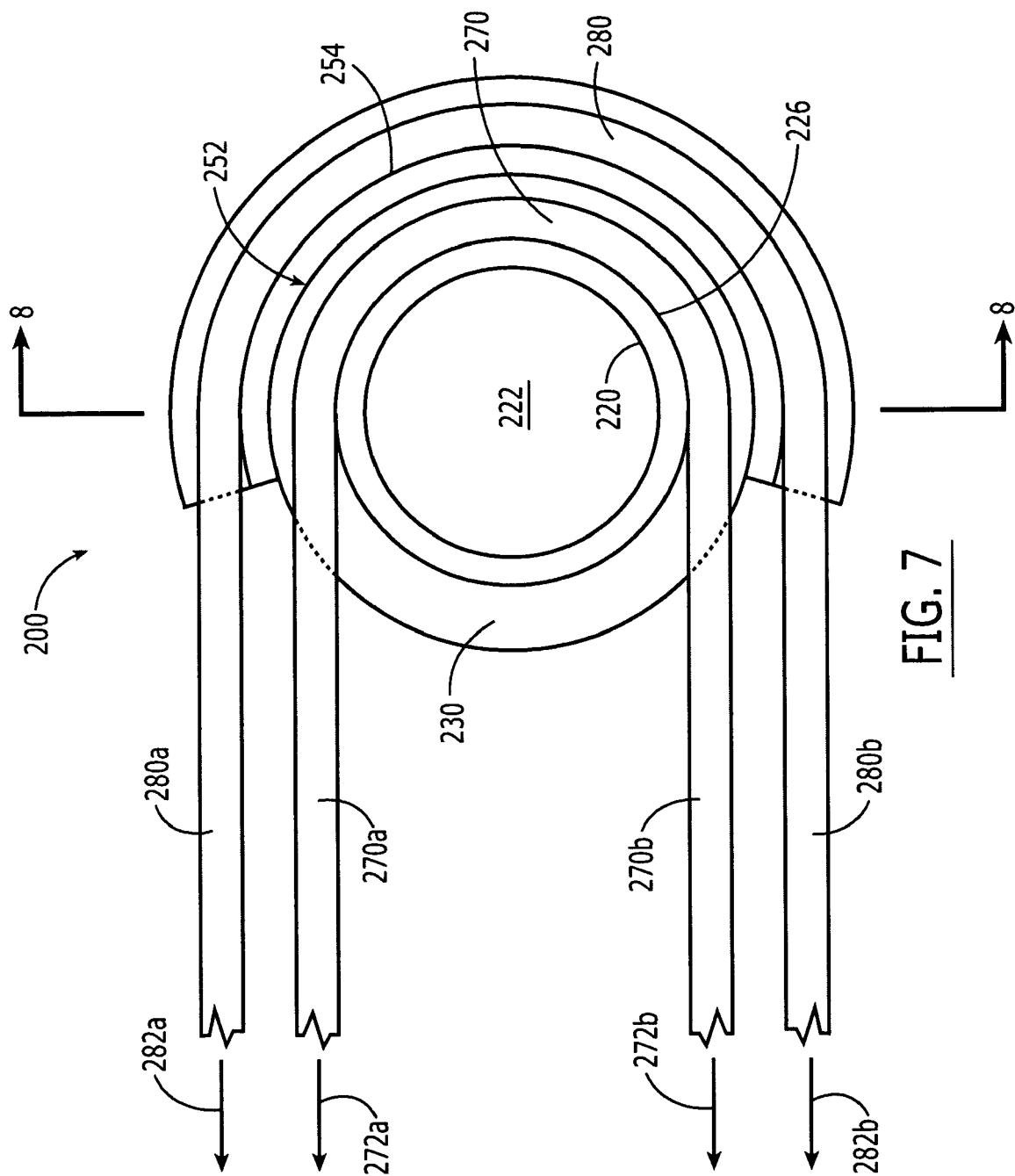
Figure 8:
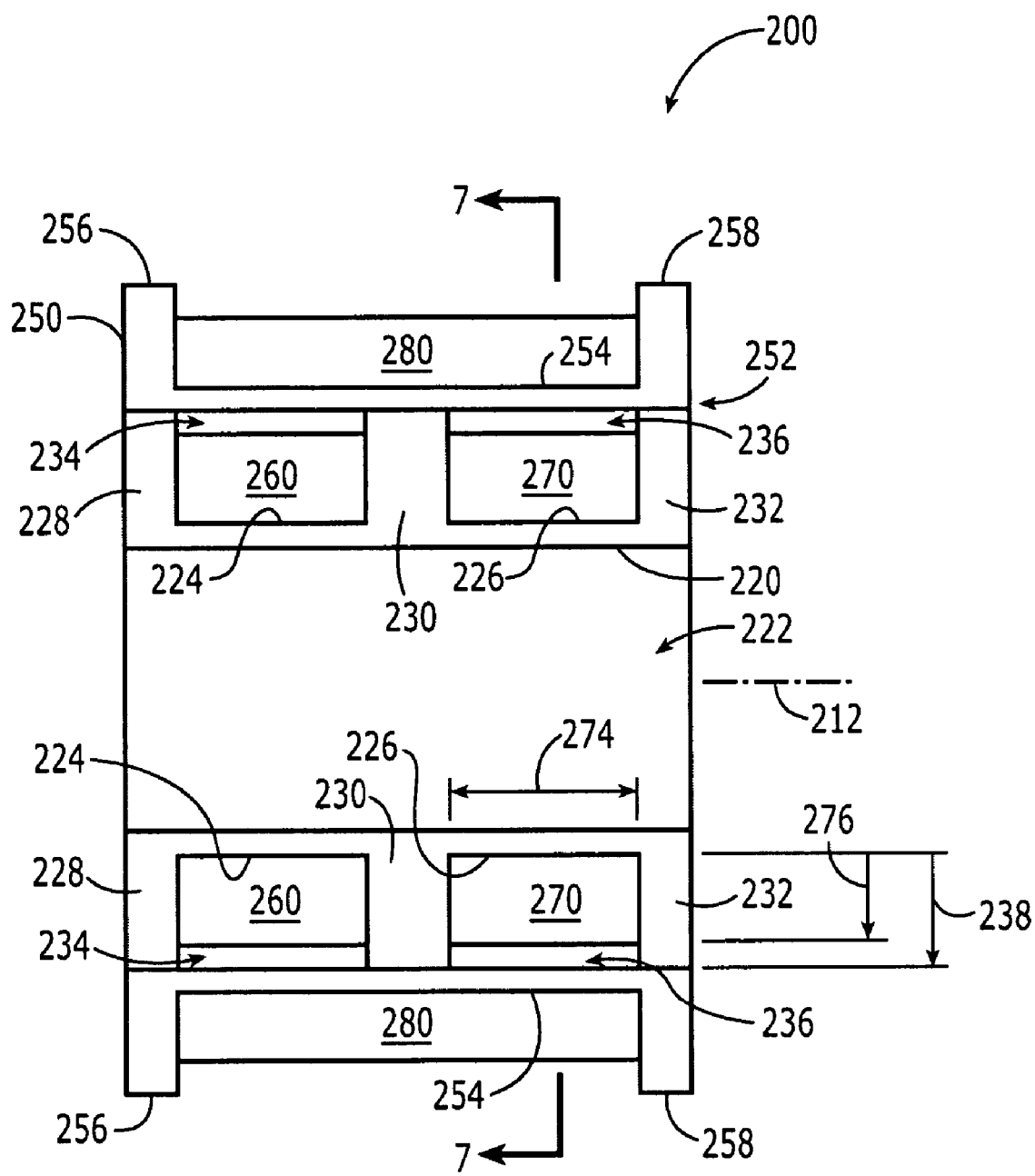
Figure 9:
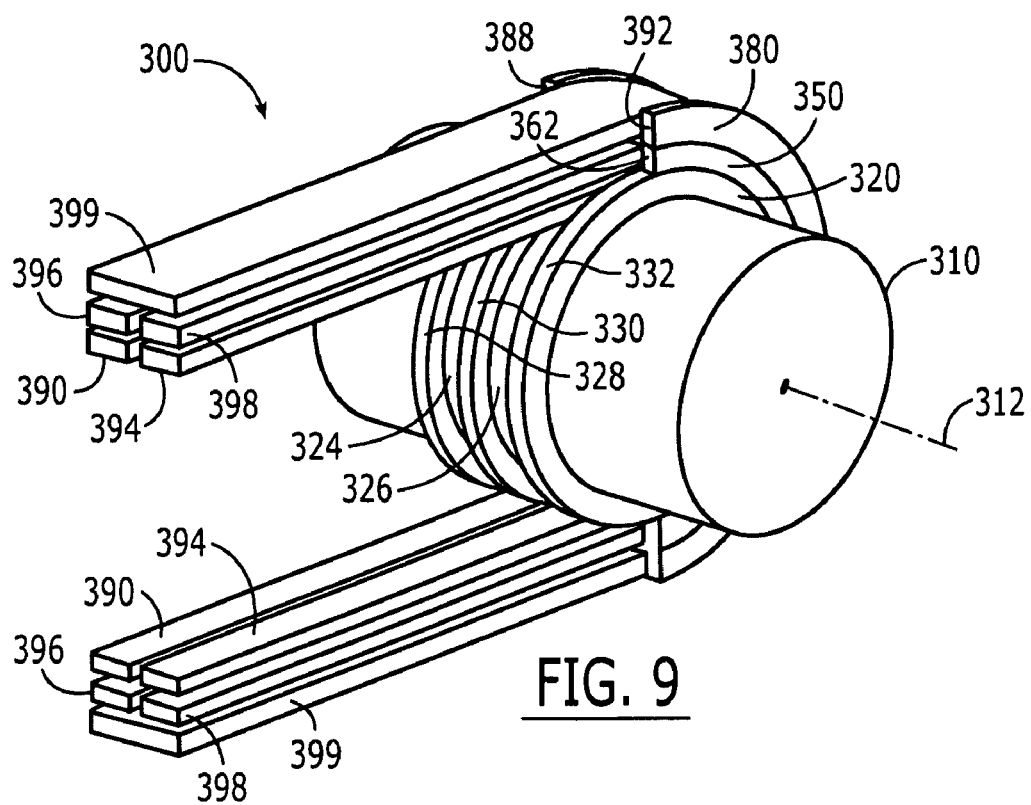
Figure 10:
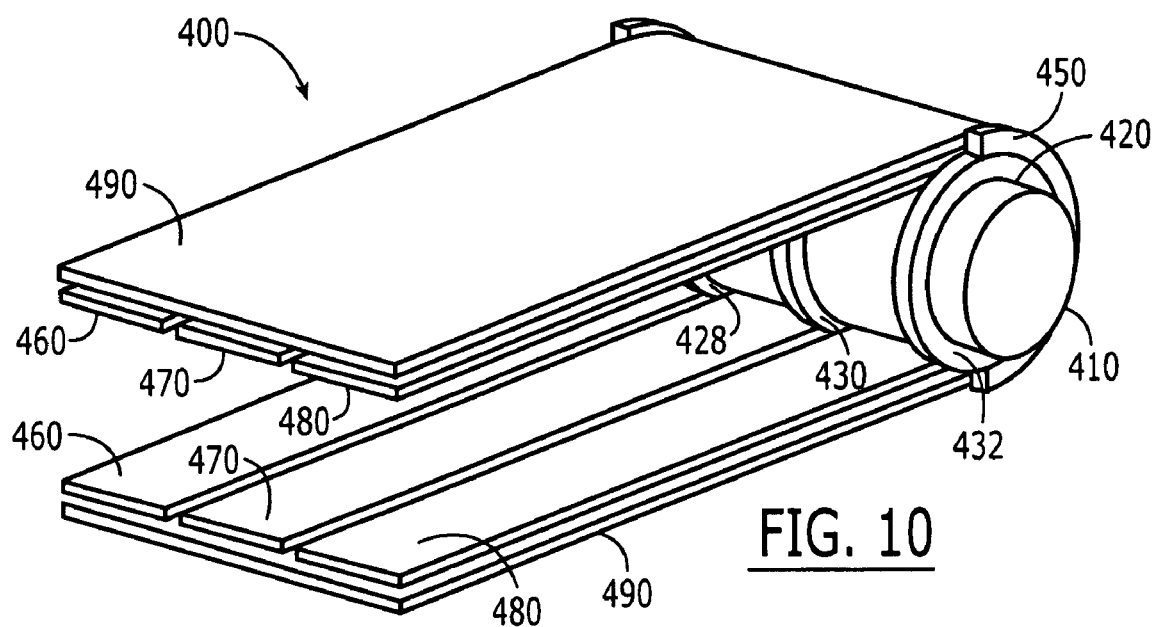
Figure 11:
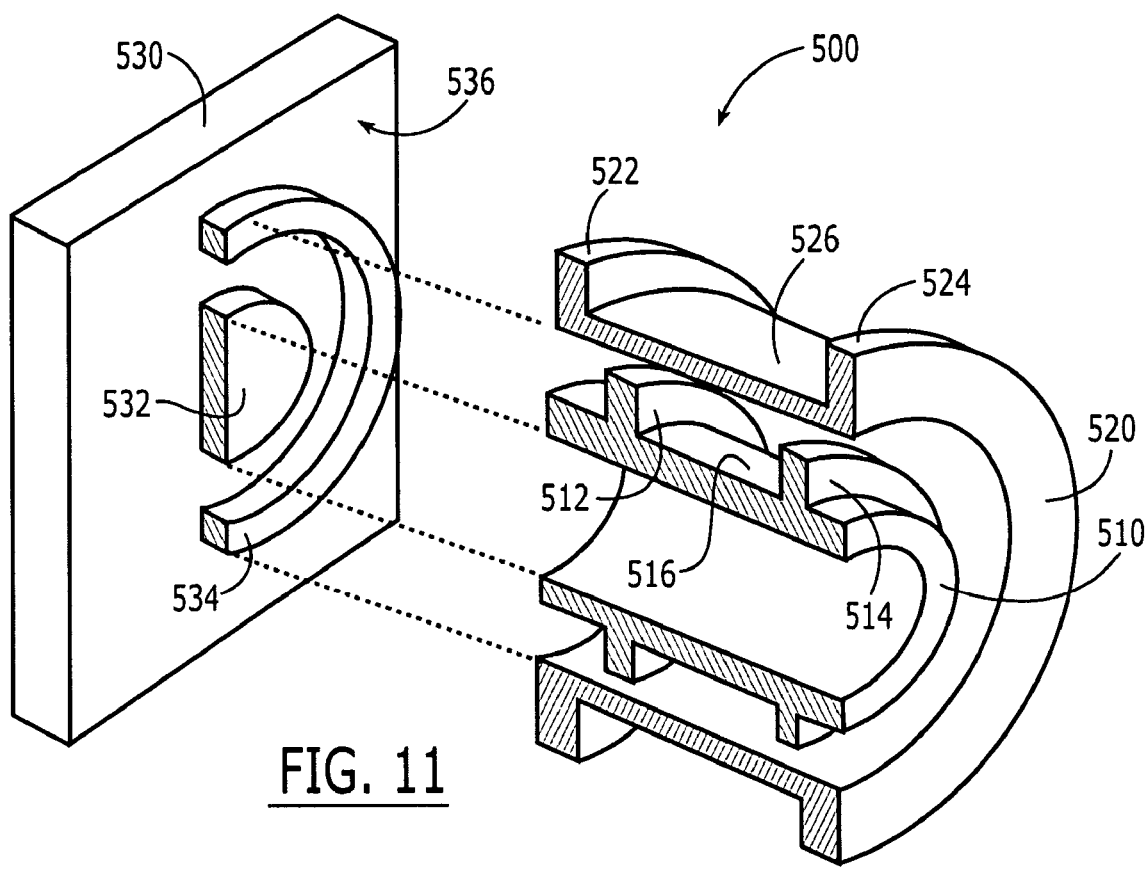
Figure 12:
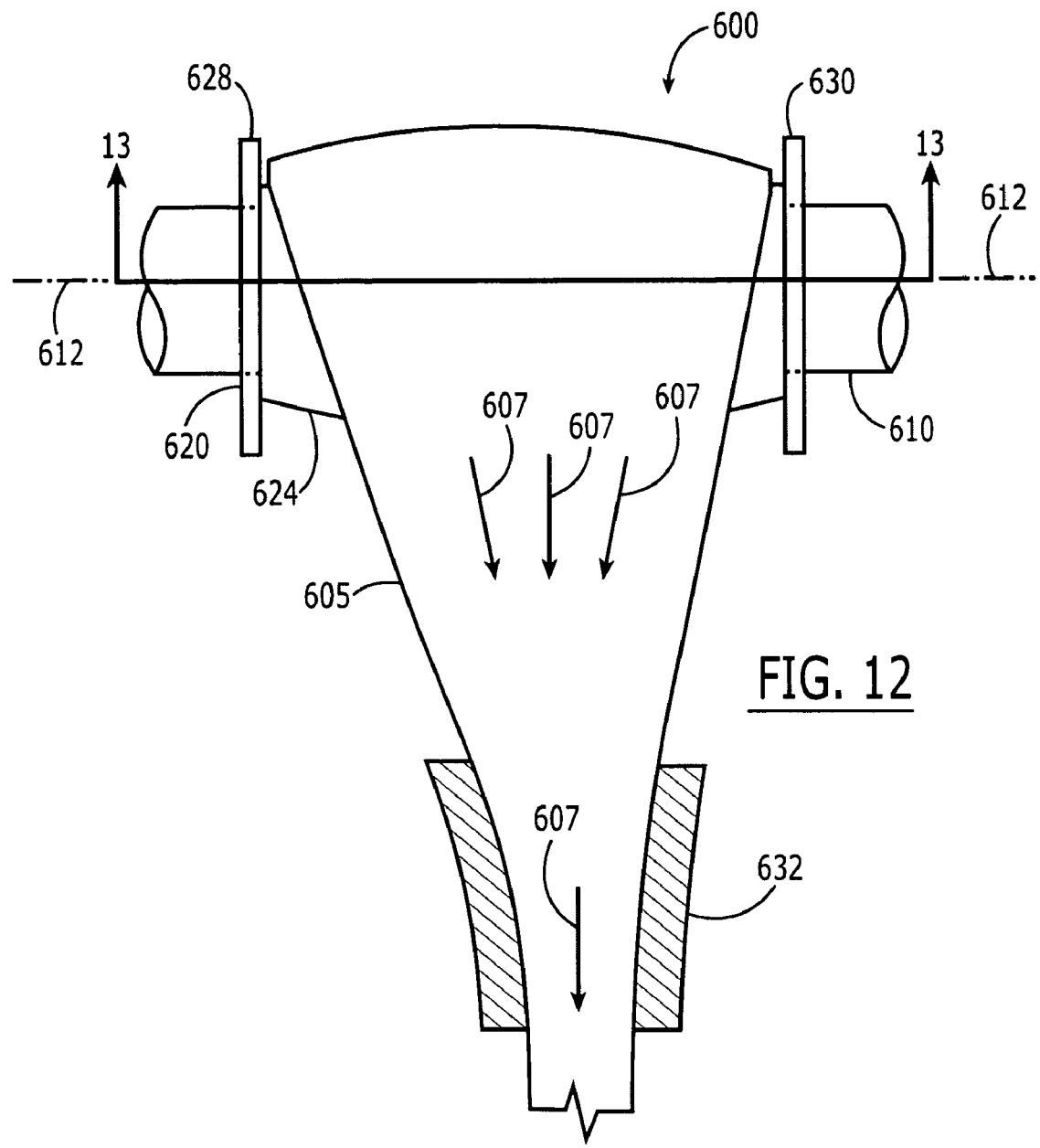
Figure 13:
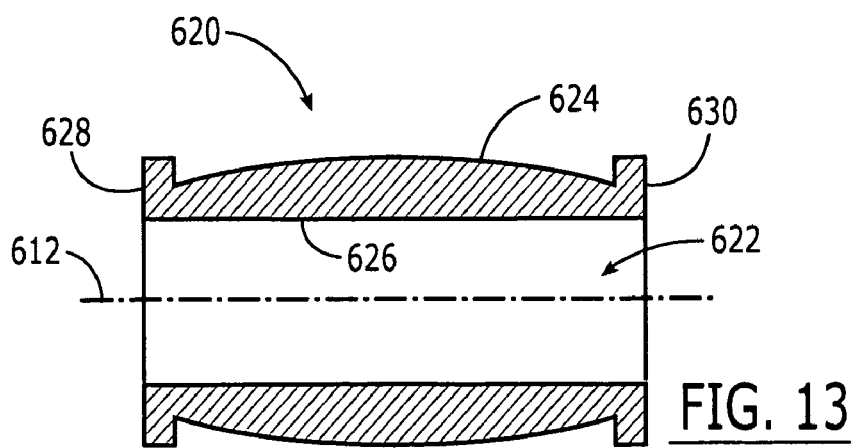
Figure 17:
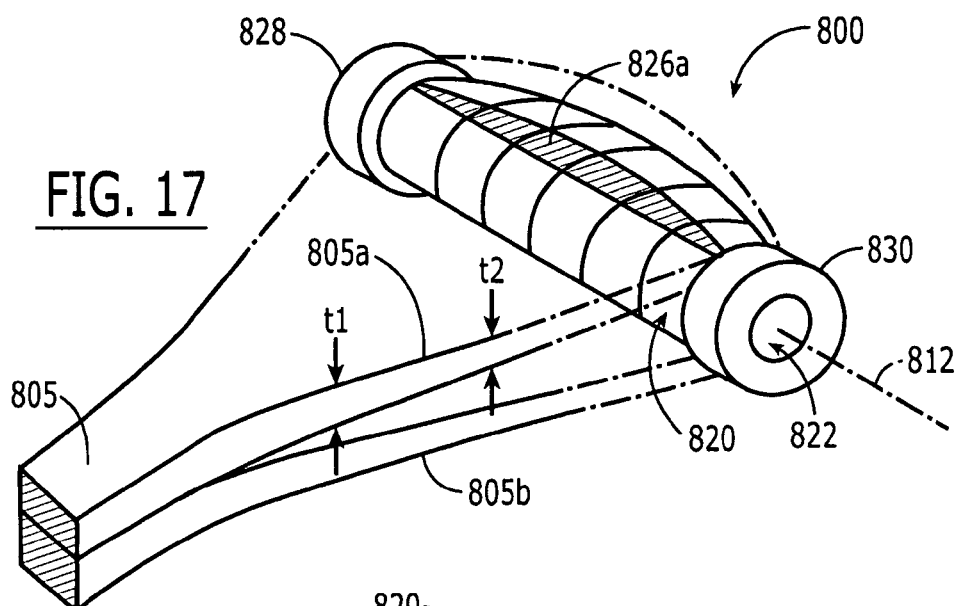
Figure 18:
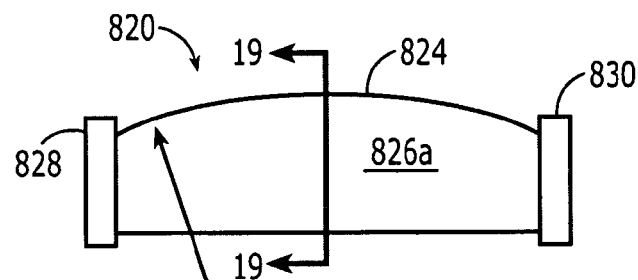

Having thus described the invention in general terms, reference will now be made to the accompanying drawings, which are not necessarily drawn to scale, and wherein:

FIG. 1 is a cross-sectional view of a tensioned member having parallel portions transferring forces to a circular cylindrical member, taken upon a plane perpendicular to the cylindrical member, illustrating a theoretical approach to understanding embodiments of the invention;

FIG. 2 is a cross-sectional view of a tensioned member having non-parallel portions transferring forces to a circular cylindrical member, taken upon a plane perpendicular to the cylindrical member, further illustrating the theoretical approach of FIG. 1;

FIG. 3 is a cross-sectional view of a tensioned member transferring forces to a non-circular cylindrical member, taken upon a plane perpendicular to the cylindrical member, further illustrating the theoretical approach of FIG. 1;

FIG. 4 is a cross-sectional view of a tensioned member transferring forces to a cylindrical member having a planar portion, taken upon a plane perpendicular to the cylindrical member, further illustrating the theoretical approach of FIG. 1;

FIG. 5 is a perspective view of a force transfer assembly, according to an embodiment of the invention, wherein a thimble transfer forces from a tensioned member to a receiving structure;

FIG. 6 is a perspective view of a force transfer assembly, according to a second embodiment of the invention, wherein two nested thimbles transfer forces to a receiving structure;

FIG. 7 is a cross-sectional view of the force transfer assembly of FIG. 6, taken upon the plane indicated by the line 7 in FIG. 8;

FIG. 8 is a cross-sectional view of the force transfer assembly of FIG. 6, taken upon the plane indicated by the line 8 in FIG. 6, and by the line 7 in FIG. 8;

FIG. 9 is a perspective view of a force transfer assembly, according to a third embodiment of the invention, wherein three nested thimbles transfer respective forces to a receiving structure;

FIG. 10 is a perspective view of a force transfer assembly, according to a fourth embodiment of the invention, wherein two nested thimbles transfer forces to a receiving structure along a relatively wide extent of the receiving structure;

FIG. 11 is a is a perspective view of a force transfer assembly, according to a fifth embodiment of the invention, wherein an outer thimble is capable of transferring force directly to a receiving structure independently of an inner thimble partially surrounded by the outer thimble;

FIG. 12 is a plan view of a force transfer assembly, according to a sixth embodiment of the invention, wherein a thimble has a convex outer bearing surface that promotes distribution of a tensioned member;

FIG. 13 is a cross-sectional view of the thimble of FIG. 12, taken upon the plane indicated by the line 13 in FIG. 12;

FIG. 14 is a perspective view of a force transfer assembly, according to a seventh embodiment of the invention, wherein members of a tensioned assembly transfer forces to respective thimbles disposed along the axis of a receiving structure;

FIG. 15 is a plan view of a thimble of FIG. 14;

FIG. 16 is a cross-sectional view of the thimble of FIG. 15, taken upon the plane indicated by the line 16 in FIG. 15;

FIG. 17 is a perspective view of a force transfer assembly, according to an eighth embodiment of the invention, wherein a thimble has a constant-radius convex bearing surface that promotes distribution of a tensioned member;

FIG. 18 is a plan view of the thimble of FIG. 17; and

Figure 19:
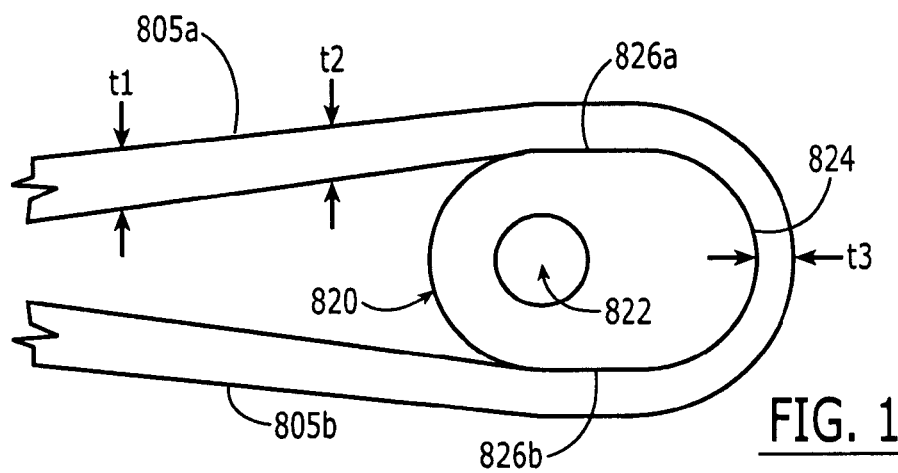

FIG. 19 is a cross-sectional view of the thimble of FIG. 17, taken upon the plane indicated by the line 19 in FIG. 18.

DETAILED DESCRIPTION OF EMBODIMENTS THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A theoretical approach to understanding the transfer of forces from a tensioned member such as a cable to a receiving structure such as a cylindrical member is described herein with references to Equations 1-7 and FIGS. 1-4. These equations, figures and any underlying theories and approximations are described to promote an understanding of concepts underlying the developments of the various embodiments of the invention that are described herein with reference to FIGS. 5-16. The present invention, having many embodiments, is not limited to any particular theoretical approach or any particular system of equations.

In FIG. 1, a tensioned member 2 transfers forces to a receiving structure 4. The receiving structure 4, having a circular cross section and a diameter "D" as shown in FIG. 1, represents a circular cylindrical member extending along a longitudinal axis 6 that is perpendicular to the circular cross section. The tensioned member 2 has a thickness "t" as shown in FIG. 1, as well as a width that extends parallel to the longitudinal axis 6 of the cylindrical member 4. All forces are presented in Equations 1-7 in terms of per unit of width of the tensioned member 2 as will be apparent in the following.

Furthermore, the tensioned member is treated in the following equations as having a rectangular cross section having a thickness "t" and a width "w" such as that shown for the tensioned member 102 in FIG. 5. It should be understood that real tensioned members may vary in cross section from perfect rectangles. For example, a cable having a generally circular cross section when unloaded may be compressed toward having a more flattened, somewhat rectangular cross section when tensioned and wrapped partially about a cylindrical member.

In the theoretical approach underlying Equations 1-7, as the member 2 is tensioned, compressive forces present across the inner surface of the tensioned member which contacts the cylindrical member may be understood as a pressure "P" between the tensioned member 2 and cylindrical member 4. Such pressure is referred to herein as compression stress. It should be understood that FIGS. 1-4 represent static scenarios without rotation of the cylindrical member 4 about the axis 6 or slipping motion of the tensioned member relative to the cylindrical member. Accordingly, centrifugal forces and frictional forces which may be considered in dynamic scenarios involving moving belts and rotating shafts are not considered in this theoretical approach.

The compression stress "P," represented by outwardly projecting pressure arrows in FIG. 1, is expressed as an outward pressure imparted on the inner surface of the tensioned member 2 by the cylindrical member 4. Parallel portions 2a and 2b of the tensioned member 2 each transfer a force "F/2" in FIG. 1 such that the total force "F" is transferred to the cylindrical member 4 from the tensioned member 2. A theoretical relationship is expressed in Equation 1 below, wherein "P" entails units of pressure in force per unit area, "F" entails a unit of force, and "D" entails a unit of length measurement. As previously stated, force "F" is expressed in these equations in terms of per unit of width "w" (see for example FIG. 5) of the tensioned member 2.

$$P = F/D \quad \text{(Equation 1)}.$$

While FIG. 1 shows a scenario wherein two portions 2a and 2b of the tensioned member 2 extending from the cylindrical member 4 are parallel, Equation 1 is applicable also to the scenario of FIG. 2 wherein two portions of a tensioned member are not parallel. Furthermore, Equation 1 is applicable to scenarios wherein a cylindrical member has a circular cross section as shown in FIGS. 1 and 2, and Equation 1 is applicable to scenarios such as that of FIG. 3 wherein a cylindrical member has a non-circular cross-section. It should be understood that the term "D," when applied to the scenario of FIG. 3, denotes the local diameter at any axial line of contact between a tensioned member and a cylindrical member, wherein axial line refers to lines parallel to the longitudinal axis of the cylindrical member. Thus, when applied to the arrangement of FIG. 3, the local "D" is computed as twice the radius of curvature at any given line of contact. According therefore to Equation 1 and the underlying theory thereof, the local compression stress "P" is inversely proportional to the local diameter "D." This is represented by the varying lengths of the outwardly projecting pressure arrows shown in FIG. 3. Furthermore, according to Equation 1 and the underlying theory thereof, a constant compression stress is imparted across the area of contact between a tensioned member and a cylindrical member having a circular cross section. This is represented by the uniform lengths of the outwardly projecting pressure arrows shown in FIG. 1.

It has thus been demonstrated that the local compression stresses imparted across local surface portions of a tensioned member that contacts a cylindrical member are dependent on the local shape of the cylindrical member. Various embodiments of the invention, some of which are illustrated in FIGS. 5-16, include thimbles having circular and non-circular outer bearing surfaces. It should be noted that the shapes of a rigid cylindrical member at points that do not contact a tensioned member do not affect compressive forces. For example, in FIG. 4, a cylindrical member is shown having a half-circle cross section. That is, the surface of the cylindrical member is circular across the area of contact, but planar across the area 8 that does not contact the tensioned member. Equation 1 is applicable nonetheless to the scenario of FIG. 4.

Tension stress along a tensioned member is defined as the tension in the member divided by the cross sectional area of the member. Relying again on the ongoing convention that forces are presented in Equations 1-7 in terms of per unit of width of a tensioned member, tension stress "S" may be determined using Equation 2 below wherein "S" entails units of stress in tensional force per unit area.

$$S = F/(2*t) \quad \text{(Equation 2)}.$$

A combining of Equations 1 and 2 results in Equation 3 below and demonstrates that compressive stress is proportional to tension stress.

$$P = (2*S*t)/D \quad \text{(Equation 3)}.$$

For each type of cable material, there is a relationship between maximum tension strength and transverse compression load. In general, as the transverse compressive load is increased, the maximum tension strength declines. While metal cable is relatively insensitive to transverse compression, high performance synthetic cables tend to be more sensitive. Depending on this relationship, the designer may choose a ratio between compression stress (P) and tension stress (S) that provides the best balance between cable cross section and thimble characteristics.

If a high ratio of compression stress to tension stress is chosen, the tension capability of the cable is reduced, resulting in a cable with greater cross section and weight in exchange for a more compact thimble. If a low ratio is chosen, the cable can be stressed closer to the ideal limit, but the thimble will be bigger in width or diameter as described below. The ratio between compression stress and tension stress is referred to herein as the stress ratio (R) and may be determined as shown in Equation 4 below.

$$R = P/S \quad \text{(Equation 4)}.$$

In Equation 4, the ratio (R) is a non-dimensional number. Using Equation 3 to substitute an expression for the compression stress (P) in Equation 4 results in a relationship among the stress ratio (R), the thickness (t), and the diameter (D) for any given particular scenario. The relationship is expressed below as Equations 5-7, which are substantively equivalent to each other.

$$R = 2*t/D \quad \text{(Equation 5)}.$$

$$t/D = R/2 \quad \text{(Equation 6)}.$$

$$= (R*D)/2 \quad \text{(Equation 7)}.$$

One may draw several conclusions from these equations. For a given ratio (R) of compression stress (P) to tension stress (S), there is a specific ratio of cable thickness (t) to cylinder diameter (D) as expressed in Equation 6, wherein a thicker cable requires a larger thimble diameter for a given ratio (R). The ratio of the cable thickness to the thimble diameter is independent of the ideal fiber tension strength but is dependent on the desired ratio (R) in the fiber. According to Equation 2, the product of allowable tension stress (S) and cable cross section area determines the total load (F) that can be achieved per unit of width of a cable. In order to accommodate high total load (F), a cable should have a given cross-sectional area. This area may be accommodated with a large diameter thimble and a thick, narrow cable or with a smaller diameter thimble and a thin, wide cable. It may not be feasible to carry a high cable load with a single small diameter thimble and a thick, narrow cable.

An embodiment of the present invention is illustrated in FIG. 5, wherein a force transfer assembly 100 comprises a tensioned member 102 that transfers forces by way of a thimble 120 to a receiving structure 110 which is illustrated as a cylindrical member such that the thimble and cylindrical member are concentric about and disposed along a longitudinal axis 112. The thimble 120 surrounds the cylindrical member 110 and the tensioned member 102 partially surrounds the thimble. The thimble 120 comprises spaced flanges 128 and 130 that extend outwardly. A bearing surface 124 is defined along the exterior of the thimble between the spaced flanges. The tensioned member abuts the bearing surface and transfers respective forces of tensioned portions 102a and 102b thereof to the receiving structure. The spaced flanges guide the tensioned member as it abuts the bearing surface of the thimble.

FIG. 5 serves as a guide by which dimensions of a tensionable member are identified herein with regard to the embodiment of the invention illustrated in FIG. 5 and with regard to embodiments illustrated in the figures that follow FIG. 5. The width "w" of the tensioned member 102 extends parallel to the longitudinal axis 112 of the thimble 120. The thickness "t" of the tensioned member is measured through the tensioned member perpendicular to the width "w." The length "L" of any particular portion of the tensioned member extending away from the thimble is chosen to suit any particular application for the force transfer assembly 100 and is therefore not further discussed herein. The outer bearing surface 124 is a circular cylindrical surface and defines the diameter "D" of the area of contact between the tensioned member and thimble. In FIG. 5, the portions 102a and 102b of the tensioned member are parallel and thus the diameter "D" may be measured between the extended portions. The tensioned portions 102a and 102b transfer respective forces 104a and 104b, which are optionally equivalent forces, to the thimble such that the vector sum of the respective forces is transferred to the receiving structure by way of the thimble.

The dimensions of the tensioned member 102 and thimble 120 and the respective tensions in the tensioned portions 102a and 102b can vary to define various scenarios of the force transfer assembly 100. The embodiment of the invention illustrated in FIG. 5, however, is not limited to any particular scenario. Nonetheless, a particular scenario is described in the following in order to merely demonstrate an example of the relations, according to Equations 1-7 and in the context of FIG. 5, between force (F), diameter (D), thickness (t), width (w), compression stress (P), and tension stress (S). Similarly, particular scenarios are later described herein with regard to some of the embodiments of the invention that are illustrated in the figures that follow FIG. 5. Those later descriptions rely on FIGS. 1-5 to define the described dimensions, forces, compression stresses and tension stresses.

In one particular tension scenario obtainable by the force transfer assembly 100 of FIG. 5, the tensioned portions 102a and 102b are parallel and are equivalently tensioned at 500,000 pounds each such that the tensioned member 102 transfers a total force (F) of 1,000,000 pounds to the cylindrical member 110 by way of the thimble 120. Furthermore, in this scenario: the diameter of the cylindrical member is 9.0 inches; the outer diameter (D) of the bearing surface 124 of the thimble is 9.5 inches; the thickness (t) of the tensioned member 102 is 0.475 inches; and the width (w) of the tensioned member is 10.526 inches. According to this scenario, the compressive forces between the tensioned member and the thimble expressed as a compression stress (P) is approximately 10,000 pounds per square inch, and the tension stress (S) in the tensioned member 102 is approximately 100,000 pounds per square inch.

Though the receiving structure 110 is illustrated in FIG. 5 as a circular cylindrical member, and though several other receiving structures are illustrated as circular cylindrical members in several other figures, it should be understood that thimbles according to the invention can transfer forces to other types of receiving structures. For example, a thimble according to at least one embodiment of the invention defines a polygonal internal channel for disposition about a polygonal cylindrical member. In one particular such embodiment, a thimble defines a hexagonal cylindrical internal channel for disposition about a cylindrical member having a hexagonal cross-sectional shape. Thus, a member having a uniform cross-sectional shape along a longitudinal axis of the member is generally described herein as being cylindrical without particular regard to whether the cross-sectional shape is circular. For further example, though several of the receiving structures illustrated in the figures are described herein as cylindrical members, it should be understood that a thimble according to at least one embodiment of the invention transfers forces to a non-cylindrical receiving structure. Thimbles and receiving structures according to the invention need not have uniform cross-sectional shapes along longitudinal axes unless otherwise specifically recited with regard to some particular embodiment of the invention. A receiving structure can have a varying cross-sectional shape corresponding to a convex or concave outer surface thereof. A central portion of a receiving structure can have an elliptical cross-sectional shape between adjacent portions having rectangular cross-sectional shapes.

Another embodiment of the present invention is illustrated in FIGS. 6-8, wherein a force transfer assembly 200 comprises a plurality of tensioned members that transfer respective forces by way of an inner thimble 220 and an outer thimble 250 to a receiving structure 210 which is illustrated as a cylindrical member disposed along the longitudinal axis 212. The inner thimble 220 surrounds the cylindrical member 210, and the inner tensioned members 260 and 270 partially surround the inner thimble 220. According to the present invention, forces are transferred from an outer tensioned member 280 to the cylindrical member 210 without causing compression of the inner tensioned members 260 and 270.

As shown in FIG. 8, the inner thimble 220 defines an inner channel 222 for disposition about the cylindrical member 210 (FIG. 6) and outer bearing surfaces 224 and 226. Spaced flanges 228, 230 and 232 extend outwardly from the inner thimble such that intermediate spaces 234 and 236 are defined between the inner thimble and outer thimble for receiving the respective tensioned members 260 and 270. The flanges are spaced along the longitudinal axis 212 and define margins of the bearing surfaces and intermediate spaces. The flanges guide the inner tensioned members as they abut the bearing surfaces. For example, the inner tensioned member 270 has a width 274 along the longitudinal axis 212 that is nestled between the flanges 230 and 232. The member 270 is prevented from moving along the axis 212 by the flanges 230 and 232. The flanges 228, 230 and 232 and inner tensioned members are dimensioned such that the outer thimble 250 is prevented from compressing the inner tensioned members 260 and 270. The flanges and the inner tensioned members are optionally dimensioned such that the outer thimble is prevented from contacting the inner tensioned members. For example, in the embodiment of the invention illustrated in FIGS. 6-8, the inner tensioned member 270 has a thickness 276 (FIG. 8) that is less than the radial height 238 of the flanges 230 and 232. The flange 230 is approximately centered along the width of the inner thimble 220. By abutting and centrally supporting the outer thimble 250 from within, the flange 230 facilitates a wide bearing surface 254 of the outer thimble and may facilitate a relatively light and thin construction of the outer thimble. Each of flanges 228, 230 and 232 separately define an annulus in that each extends from adjacent the bearing surfaces of the inner thimble to the inner channel of the outer thimble and each completely surrounds the cylindrical member. Though the flanges of the inner thimble are illustrated in FIG. 6 as annuli that completely surround the cylindrical member, in other embodiments of the invention, flanges that extend from an inner thimble to support an outer thimble only partially surround a cylindrical member such that each defines a partial annulus. In such other embodiments, weight efficient flanges optionally include only load-bearing portions and the weight of such flanges is advantageously minimized. Weight efficient flanges may also comprise skeletal frameworks, such as spoke and rim arrangements, according to various embodiments of the invention.

Outer bearing surfaces 224 and 226 (FIG. 8) of the inner thimble 220 abut the respective tensioned members 260 and 270 and transfer forces from the tensioned members to the cylindrical member 210 through the inner thimble. As shown in FIG. 6, opposing portions 260a and 260b of the inner tensioned member 260 transfer respective forces 262a and 262b to the cylindrical member 210 through the inner thimble 220. The area of contact between the inner tensioned member 260 and the bearing surface 224 may provide little friction or the scenario of FIGS. 6-8 may be otherwise equilibrated such that the forces 262a and 262b may be approximately equivalent forces. Similarly, opposing portions 270a and 270b of the inner tensioned member 270 transfer respective forces 272a and 272b, which may be approximately equivalent forces, to the cylindrical member 210 through the inner thimble.

The outer thimble 250 defines an inner channel 252 (FIG. 6) for disposition partially about both the inner thimble 220 and cylindrical member 210 such that the outer thimble and inner thimble are nested together about the cylindrical member 210. An outer bearing surface 254 (FIGS. 7 and 8) of the outer thimble abuts the outer tensioned member 280 and transfers forces to the cylindrical member 210 by way of the outer thimble 250 and inner thimble 220. The inner channel 252 of the outer thimble 250 abuts the flanges 228, 230 and 232 of the inner thimble 220 such that the outer thimble is prevented from compressing the inner tensioned members 260 and 270 as the forces of the outer tensioned member 280 are transferred to the cylindrical member 210. Though the outer thimble and inner thimble are illustrated in FIG. 7 as nested together concentrically about the member 210, it should be understood that they may be otherwise nested together with some amount of offset between their respective central axes.

Opposing portions 280a and 280b of the tensioned member 280 transfer respective forces 282a and 282b, which may be approximately equivalent forces, to the cylindrical member by way of the outer thimble 250 and inner thimble 220 without compressing the inner tensioned members 260 and 270. Flanges 256 and 258 extend outwardly from the outer thimble 250 and are spaced along the longitudinal axis 212. The flanges 256 and 258 define margins of the bearing surface 254 and guide the outer tensioned member 280 as it abuts the bearing surface 254. Each of the flanges 256 and 258 separately define a partial annulus in that each extends radially outward from adjacent the bearing surface 254 and each only partially surrounds the inner thimble and cylindrical member.

In order that the inner tensioned members 260 and 270 may reach the inner thimble 220, the outer thimble 250 only partially surrounds the inner thimble in the embodiment of the invention illustrated in FIGS. 6-8. In another embodiment of the invention, the bearing surface of an outer thimble has formed therethrough one or more slots for the passage of inner tensioned members to an inner thimble. In that other embodiment, flanges of the outer thimble nonetheless define annuli that completely surround the inner thimble without interfering with the passage of inner tensioned members through the one or more slots.

The outer thimble 250, the inner thimble 220, and the flanges 228, 230 and 232 are preferably formed of rigid material such that forces from the outer tensioned member 280 are transferred by way of the outer thimble 280 and inner thimble 220 to the cylindrical member 210 without the forces transferred from the outer tensioned member causing compression of the inner tensioned members 260 and 270. The spaced flanges 228, 230 and 232 transfer forces having at least radial components from the outer thimble to the cylindrical member 210 and thereby protect the inner tensioned members.

In one particular tension scenario obtainable by the force transfer assembly 200 of FIG. 6, the tensioned members transfer a total force of 1,000,000 pounds to the cylindrical member 210 with a tension stress of 100,000 pounds per square inch and a stress ratio of 0.10. Furthermore, in this scenario: the diameter of the cylindrical member 210 is 9.0 inches; the diameter of the outer thimble 250 is 11.0 inches; the width of the outer thimble is 5.376 inches; the thickness of each inner tensioned member 260 and 270 is 0.475 inches; and the thickness of the outer tensioned member 280 is 0.550 inches. Thus, in this tension scenario, the force transfer assembly 200 transfers the same total force as in the scenario described previously with reference to the force transfer assembly 100 of FIG. 5. Note, however, that the force transfer assembly 200 of FIG. 6 in this current scenario is more compact along the longitudinal axis of the cylindrical member when compared to the previously described FIG. 5 scenario.

It should be understood that an outer thimble may at least partially surround any number of inner thimbles according to various embodiments of the invention. In the embodiment of the invention illustrated in FIGS. 6-8, there are, in a sense, two discrete layers of tensioned members, wherein the adjacent inner tensioned members 260 and 270 define a first layer and the outer tensioned member 280 defines a second layer. However, in other embodiments of the invention, such as that illustrated in FIG. 9, there are more than two layers of tensioned members.

In FIG. 9, a force transfer assembly 300 comprises a plurality of tensioned members that transfer respective forces to a receiving structure 310 by way of a nested assembly of thimbles that prevents relatively outer tensioned members from compressing relatively inner tensioned members. A first thimble 320 generally surrounds the receiving structure 310 which is illustrated as a cylindrical member disposed along the longitudinal axis 312. First tensioned members 390 and 394 partially surround the first thimble 320 and transfer forces to the cylindrical member 310 by way of the first thimble. The first thimble 320 defines outer bearing surfaces 324 and 326 that abut the first tensioned members 390 and 394 respectively and receive forces from the tensioned members. Spaced first flanges 328, 330 and 332 extend outwardly from the first thimble 320 such that intermediate spaces for receiving the first tensioned members are defined between the first thimble and second thimble 350. The first flanges 328, 330 and 332 define margins of the bearing surfaces 324 and 326 and guide the first tensioned members 390 and 394 as the tensioned members abut the bearing surfaces.

A second thimble 350 partially surrounds the first thimble 320 such that the first thimble and second thimble are nested together concentrically about the longitudinal axis 312. The first thimble surrounds the cylindrical member 310 and the second thimble partially surrounds the receiving structure and first thimble. Tensional forces of the second tensioned members 396 and 398 are transferred to the cylindrical member 310 by way of the second thimble 350 and first thimble 320 without the forces transferred causing compression of the first tensioned members 390 and 394. The spaced annular flanges 328, 330 and 332 transfer forces having at least radial components from the second thimble 350 to the cylindrical member 310 and thereby protect the first tensioned members 390 and 394.

A third thimble 380 partially surrounds the first thimble 320 and second thimble 350 such that the first thimble, second thimble and third thimble are nested together about the cylindrical member 310. Tensional forces of the third tensioned member 399 are transferred to the cylindrical member 310 by way of the third thimble, second thimble and first thimble without the forces transferred causing compression of the first tensioned members 390 and 394 and second tensioned members 396 and 398. The second thimble 350 comprises at least one flange 362 that extends outwardly and transfers forces having at least radial components from the third thimble 380 to the first thimble 320. The partially annular flange 362 of the second thimble 350 thereby protects the second tensioned members 396 and 398. The third thimble 380 comprises a spaced pair of partially annular flanges 388 and 392 that extend outwardly and guide the third tensioned member 399 as it abuts the third thimble.

In one particular tension scenario obtainable by the force transfer assembly 300 of FIG. 9, the tensioned members transfer a total force of 1,000,000 pounds to the cylindrical member 310 with a tension stress of 100,000 pounds per square inch and a stress ratio of 0.10. Furthermore, in this scenario: the diameter of the cylindrical member 310 is 9.0 inches; the diameter of the third thimble is 13.070 inches; the width of the third thimble is 3.267 inches; the thickness of the first tensioned members is 0.475 inches; the thickness of the second tensioned members is 0.560 inches; and the thickness of the third tensioned member 0.654 inches. Thus, in this scenario, the force transfer assembly 300 transfers the same total force as in the scenarios described previously with references to the force transfer assemblies 100 of FIG. 5 and 200 of FIG. 6. Note, however, that the force transfer assembly 300 of FIG. 9 in this current scenario is more compact along the longitudinal axis of the cylindrical member when compared to the FIGS. 5 and 6 scenarios.

It should be understood in view of at least FIGS. 6 and 9 that, according to the invention, any number of thimbles can protect respective layers of tensioned members from compression forces while transferring tensional forces from the members to a receiving structure. For example, there are three discrete layers of tensioned members in the embodiment of the invention illustrated in FIG. 9. The adjacent first tensioned members 390 and 394 define a first layer. The adjacent second tensioned members 396 and 398 define a second layer. The third tensioned member 399 defines a third layer. For another example, there are two illustrated layers of tensioned members in the embodiment of the invention illustrated in FIGS. 6-8.

It should further be understood that a thimble according to the invention can host almost any number of tensioned members. For example, in FIG. 9 the second thimble 350 hosts the two tensioned members 396 and 398 while the third thimble 380 hosts the one tensioned member 399. For another example, a thimble hosts three tensioned members in FIG. 10 as described below.

In FIG. 10, a force transfer assembly 400 comprises a plurality of tensioned members that transfer respective forces by way of an inner thimble 420 and an outer thimble 450 to a receiving structure 410 which is illustrated as a cylindrical member. The inner thimble 420 surrounds the cylindrical member 410 and the inner tensioned members 460, 470 and 480 partially surround the inner thimble. Respective tensional forces of each of the inner tensioned members are transferred to the cylindrical member by way of the inner thimble. An outer thimble 450 partially surrounds the inner thimble and transfers tensional forces from an outer tensioned member 490 to the cylindrical member 410 by way of the inner thimble 420 without causing compression of the inner tensioned members. The inner thimble 420 comprises several flanges 428, 430 and 432 that extend outwardly from the inner thimble to guide and protect the inner tensioned members 460, 470 and 480.

In one particular tension scenario obtainable by the force transfer assembly 400 of FIG. 10, the tensioned members transfer a total force of 1,000,000 pounds to the cylindrical member 410 with a tension stress of 100,000 pounds per square inch and a stress ratio of 0.10. Furthermore, in this scenario: the diameter of the outer thimble is 5.343 inches; the width of the outer thimble is 10.526 inches; the thickness of the inner tensioned members is 0.230 inches; and the thickness of the outer tensioned member is 0.267 inches. Thus, in this scenario, the force transfer assembly 400 transfers the same total force as in the scenarios described previously with references to the force transfer assemblies 100 of FIG. 5, 200 of FIG. 6, and 300 of FIG. 9. Note, however, that the force transfer assembly 400 of FIG. 10 in this current scenario is more extended along the longitudinal axis of the cylindrical member and is more compact radially about the longitudinal axis when compared to FIGS. 5, 6, and 9 scenarios.

In each of the various embodiments of the invention illustrated in FIGS. 6-10, a thimble transfers a force from a tensioned member to a receiving structure by way of another thimble. For example, in FIG. 6, the outer thimble 250 transfers force from the outer tensioned member 280 to the cylindrical member 212 by way of the inner thimble 220. In other embodiments of the invention, nested thimbles transfer respective forces to a receiving structure independently.

In FIG. 11, a force transfer assembly 500 according to the invention comprises nested thimbles 510 and 520 and a receiving structure 530. The receiving structure 530 comprises a semicircular inner boss 532 and an arcuate outer boss 534 that each depend outwardly from a planar surface 534 of the receiving structure. The outer boss 534 is disposed to partially surround the inner boss 532 such that the bosses are nested together. The inner thimble 510 is adapted to engage and partially surround the inner boss 532 and transfer force to the receiving structure by way of the inner boss. The outer thimble 520 is adapted to engage and partially surround the outer boss 534 and transfer force to the receiving structure by way of the outer boss.

The inner thimble 510 comprises flanges 512 and 514 that extend outwardly from the inner thimble. A bearing surface 516 for abutting a tensionable member and receiving forces therefrom is defined between the flanges 512 and 514 of the inner thimble. The outer thimble 520 comprises flanges 522 and 524 that extend outwardly from the outer thimble. A bearing surface 526 for abutting a tensionable member and receiving forces therefrom is defined between the flanges 522 and 524 of the outer thimble. The outer thimble 520 is capable of receiving forces from a tensionable member and transferring forces to the receiving structure independently of the first thimble. The force transfer assembly 500 may further comprise an additional receiving structure opposing the structure 530 for capturing the thimbles 510 and 520 between opposing receiving structures.

In the embodiments of the invention illustrated in FIGS. 6-11, bearing surfaces of thimbles are illustrated as essentially cylindrical. For example, in FIGS. 6-8, the bearing surface 226 of the inner thimble 220 is illustrated as a circular cylindrical surface. For further example, the bearing surface 254 of the outer thimble 250 is illustrated in FIGS. 7 and 8 as a portion of a circular cylindrical surface. Nonetheless, these figures and the preceding descriptions thereof relate to non-cylindrical bearing surfaces as well. For example, in FIGS. 12 and 13, a thimble has a convex outer bearing surface that abuts a tensioned member and promotes the distribution of a tensioned member along a longitudinal axis of the thimble.

In FIG. 12, a force transfer assembly 600 comprises a thimble 620 that transfers forces from a tensioned member 605 to a receiving structure 610. As shown in FIG. 13, an inner bearing surface 626 of the thimble defines an internal channel 622 about a longitudinal axis 612 for receiving the structure 610 such that the thimble at least partially surrounds the receiving structure 610. A convex bearing surface 624 of the thimble bulges outwardly (FIG. 13) and abuts the tensioned member 605 in FIG. 12. Tensional forces 607 are transferred from the tensioned member 605 to the receiving structure 610 by way of the thimble 620 through the bearing surface 624. Flanges 628 and 630 extend outwardly from the thimble and guide the tensioned member 605 as it abuts the thimble. In a variation of the force transfer assembly having layered thimbles and tensioned members, an outer thimble passes partially about the thimble 620 and is supported by the flanges 628 and 630.

The convex bearing surface 624 promotes distribution of the tensioned member 605 in its abutment with the thimble along the longitudinal axis 612. By this distribution, layering of the tensioned member 605 is at least partially minimized. For example, the tensioned member 605 optionally comprises an assembly of parallel tensioned filaments such as those of a woven belt or strap. Gathering of the filaments about the bearing surface by concentration of the tensioned member 605 along the longitudinal axis 612 would likely entail some layering of the filaments such that some filaments would compress other filaments. A cylindrical bearing surface might allow migration from the distribution of FIG. 12 toward a layered gathering of the filaments that would likely entail compromising compression. The convex bearing surface 624, however, promotes the illustrated distribution and promotes the minimization of the thickness of the tensioned member 605 where it abuts the bearing surface 624. The force transfer assembly 600 further comprises a converging guide 632 for guiding the tensioned member 605 to converge as the tensioned member extends away from the thimble 620.

An alternative arrangement for distributing tensionable members along a receiving structure is illustrated in FIGS. 14-16. In FIG. 14, a force transfer assembly 700 according to an embodiment of the invention comprises a first thimble 720 disposed about a cylindrical member 710 and a second thimble 721 disposed about the cylindrical member 710. The second thimble is spaced along the cylindrical member from the first thimble. The cylindrical member is disposed along a longitudinal axis 712. The first and second thimbles are substantially similar but are disposed and oriented differently from each other in relation to the cylindrical member. Therefore the structure of the first thimble is described herein in detail without duplicative descriptions of the structure of the second thimble As shown in FIGS. 15-16, the thimble 720 comprises a cylindrical outer bearing surface 724 for abutting a tensioned member. The outer bearing surface 724 defines an axis 726 to which the cylindrical bearing surface 724 is generally parallel. The thimble defines an internal bore 722 having a bore axis 714 that is angularly displaced from the axis 726 by an angle A. The thimble 720 comprises spaced flanges 728 and 730 that extend outwardly from the bearing surface 724 for guiding a tensioned member and that define margins of the bearing surface 724.

In FIG. 14, a tensioned assembly 740 of tensioned members comprises first and second tensioned members 741 and 742 that at least partially surround and abut the respective first and second thimbles 720 and 721. The tensioned members are spaced from each other along the longitudinal axis 712 and converge toward a joined portion 743 of the tensioned assembly 740 as they extend away from the thimbles. The first tensioned member 741 transfers tensional forces to the cylindrical member 710 by way of the first thimble 741. The second tensioned member 742 transfers tensional forces to the cylindrical member 710 by way of the second thimble 721. Aggregate tensional forces of the tensioned assembly 740 present along the joined portion 743 are thereby distributed along the longitudinal axis 712 by the separated first and second tensioned members 741 and 742. The distribution of the forces occurs without the first tensioned member 741 compressing the second tensioned member 742. The first and second thimbles 720 and 721 are oriented and disposed along the cylindrical member 710 to guide the respective first and second tensioned members 741 and 742 as the tensioned members diverge from the joined portion 743 toward the spaced thimbles. In a variation of the force transfer assembly having layered thimbles and tensioned members, outer thimbles pass partially about the thimbles 720 and 721 and are supported by the respective flanges that extend outwardly from the thimbles 720 and 721.

In FIG. 17, a force transfer assembly 800 comprises a thimble 820 that transfers forces from a tensioned member 805 to a receiving structure. The thimble defines an internal channel 822 about a longitudinal axis 812 for receiving a structure such that the thimble at least partially surrounds the structure. The thimble comprises a convex bearing surface 824 that bulges outwardly with an arc that extends along the longitudinal axis with a constant radius "R" as shown in FIG. 18. The thimble further comprises planar portions 826a and 826b which abut respective portions 805a and 805b of the tensioned member. Flanges 828 and 830 extend outwardly from the thimble and guide the portions 805a and 805b of the tensioned member 805. In a variation of the force transfer assembly having layered thimbles and tensioned members, an outer thimble passes partially about the thimble 820 and is supported by the flanges 828 and 830.

The convex bearing surface 824 promotes distribution of the tensioned member 805 in its abutment with the thimble along the longitudinal axis 812. By this distribution, layering of the tensioned member 805 is at least partially minimized about the thimble 820. The thickness of the tensioned member diminishes and the width of the tensioned member expands as the member approaches the thimble 820. For example, the tensioned member thins from a greater thickness "t1" to a lesser thickness "t2" (FIG. 17, FIG. 19) as it approaches the thimble and reaches a minimized thickness "t3" as it abuts the convex bearing surface 824 as shown in FIG. 19.

The particular embodiments of the invention that are described herein address needs for improvements in cable terminations and connectors. For example, compact thimble arrangements are provided by one or more of the described embodiments. Furthermore, one or more described embodiments provide nested thimbles that protect inner tensionable members from shear forces and transverse compressions that might otherwise be imparted by outer tensionable members.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A force transfer assembly for transferring forces from tensioned members to a receiving structure, the assembly comprising:
   a first thimble comprising a bearing surface for passing a first tensionable member thereabout, said first thimble defining an inner channel for disposition at least partially about a portion of a receiving structure such that force is transferred from the first tensionable member to the receiving structure by said first thimble;
   a second thimble comprising a bearing surface for passing a second tensionable member thereabout, said second thimble defining an inner channel for disposition at least partially about a portion of the receiving structure such that force is transferred from the second tensionable member to the receiving structure by said second thimble;
   wherein the inner channel defined by said second thimble is dimensioned for receiving therein at least a portion of said first thimble such that said first thimble and said second thimble are nested together and an intermediate space for receiving at least a portion of the first tensionable member is defined between said first thimble and said second thimble.

2. A force transfer assembly according to claim 1, further comprising a flange disposed between said first thimble and said second thimble.

3. A force transfer assembly according to claim 2, wherein said flange is disposed adjacent the intermediate space and defines a margin thereof.

4. A force transfer assembly according to claim 2, wherein said flange extends from the bearing surface of said first thimble to the inner channel defined by said second thimble such that force transferred from the second tensionable member to the receiving structure is transferred by way of said flange and said first thimble.

5. A force transfer assembly according to claim 1, wherein said first thimble defines the inner channel for disposition about a portion of a receiving structure that comprises a cylindrical member such that force is transferred from the first tensionable member to the cylindrical member by said first thimble.

6. A force transfer assembly according to claim 1, wherein said first thimble defines the inner channel thereof for disposition about a portion of a receiving structure that comprises a boss such that force is transferred from the first tensionable member to the boss by said first thimble.

7. A force transfer assembly according to claim 1, wherein said first thimble and said second thimble are configured and nested together such that said second thimble is prevented from compressing the first tensionable member.

8. A force transfer assembly according to claim 1, wherein the receiving structure is part of an aircraft, a watercraft, a crane, a winch, a building, or a bridge.

9. A force transfer assembly comprising:
   a receiving structure;
   a first thimble supported by said receiving structure;
   a first tensioned member passed at least partially about said first thimble such that force is transferred from said first tensioned member to said receiving structure by way of said first thimble;
   a second thimble supported by said first thimble; and
   a second tensioned member passed at least partially about said second thimble such that force is transferred from said second tensioned member to said receiving structure by way of said second thimble and said first thimble.

10. A force transfer assembly according to claim 9, wherein said second thimble and said first thimble are nested together such that at least a portion of said first thimble is at least partially surrounded by at least a portion of said second thimble.

11. A force transfer assembly according to claim 10, wherein said second thimble and said first thimble are concentrically arranged about at least a portion of said receiving structure.

12. A force transfer assembly according to claim 9, further comprising at least one flange that extends between said first thimble and said second thimble such that said second thimble is supported by said first thimble by way of at least said flange.

13. A force transfer assembly according to claim 12, wherein said flange is attached to and extends outward from said first thimble.

14. A force transfer assembly according to claim 12, further comprising a third tensioned member passed at least partially about said first thimble such that force is transferred from said third tensioned member to said receiving structure by way of said first thimble, wherein said flange is disposed between said first tensioned member and said third tensioned member.

15. A force transfer assembly according to claim 12, wherein at least said flange prevents said second thimble from contacting said first tensioned member.

16. A force transfer assembly according to claim 9, wherein:
   said receiving structure comprises a cylindrical shaft;
   said first thimble is disposed at least partially about said cylindrical shaft;
   said second thimble is disposed at least partially about said first thimble.

17. A force transfer assembly according to claim 16, further comprising a flange that defines at least a partial annulus that extends between said first thimble and said second thimble.

18. A force transfer assembly according to claim 9, further comprising:

a third thimble supported by said second thimble; and a third tensioned member passed at least partially about said third thimble such that force is transferred from said third tensioned member to said receiving structure by way of said third thimble, said second thimble and said first thimble.

19. A force transfer assembly according to claim 9, wherein said first thimble and said second thimble are configured and disposed such that said second thimble is prevented from compressing said first tensioned member.

20. A force transfer assembly according to claim 9, wherein said receiving structure is part of an aircraft, a watercraft, a crane, a winch, a building or a bridge.

* * * * *

UNITED STATES PATENT AND TRADEMARK OFFICE
CERTIFICATE OF CORRECTION

| | |
|---|---|
| PATENT NO. | : 7,641,177 B2 |
| APPLICATION NO. | : 11/332907 |
| DATED | : January 5, 2010 |
| INVENTOR(S) | : Blaine K. Rawdon |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this

Sixteenth Day of November, 2010

David J. Kappos
*Director of the United States Patent and Trademark Office*